(12) United States Patent
Bielefedt

(10) Patent No.: US 8,128,368 B2
(45) Date of Patent: Mar. 6, 2012

(54) APPARATUS FOR THE VENTILATON OF A ROTOR HUB OF A WIND ENERGY PLANT

(75) Inventor: Lars Christian Bielefedt, Rostock (DE)

(73) Assignee: Nordex Energy GmbH, Norderstedt (DE)

(*) Notice: Subject to any disclaimer, the term of this patent is extended or adjusted under 35 U.S.C. 154(b) by 850 days.

(21) Appl. No.: 12/204,990

(22) Filed: Sep. 5, 2008

(65) Prior Publication Data

US 2009/0108690 A1 Apr. 30, 2009

(30) Foreign Application Priority Data

Oct. 31, 2007 (DE) .................. 10 2007 052 276

(51) Int. Cl.
F03B 11/00 (2006.01)

(52) U.S. Cl. ...................... 416/115; 415/201

(58) Field of Classification Search .............. 415/4.3, 415/4.5, 115, 201
See application file for complete search history.

(56) References Cited

U.S. PATENT DOCUMENTS

| 7,513,736 | B2* | 4/2009 | Jannasch et al. | 415/108 |
| 2004/0160063 | A1 | 8/2004 | Le Nabour et al. | |
| 2009/0060748 | A1* | 3/2009 | Landa et al. | 416/93 R |
| 2011/0158818 | A1* | 6/2011 | Andersen et al. | 416/244 A |

FOREIGN PATENT DOCUMENTS

| DE | 10 2004 058 776 B3 | 7/2007 |
| JP | 2007113518 | 5/2007 |

* cited by examiner

Primary Examiner — Sheila V Clark
(74) Attorney, Agent, or Firm — Vidas, Arrett & Steinkraus, P.A.

(57) ABSTRACT

Apparatus for the ventilation of a rotor hub of a wind energy plant, with a cup-shaped ventilation cap, which has a circumferential side wall and a base portion, wherein the side wall has at least one bore for draining water and the base portion has at least one bore for ventilation, a pipe-shaped connection piece, which has an air entrance opening which runs out into an interior space of the rotor hub, wherein the ventilation cap is arranged before the air entrance opening and the at least one bore for ventilation is arranged in the ventilation cap outside of the air entrance opening of the pipe-shaped connection piece such that the air entrance opening is covered up by the ventilation cap.

10 Claims, 2 Drawing Sheets

APPARATUS FOR THE VENTILATON OF A ROTOR HUB OF A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an apparatus for the ventilation of a rotor hub of a wind energy plant.

From DE 10 2004 058 776 B3, the entire contents of which is incorporated herein by reference, an apparatus for the ventilation of a rotor hub of a wind energy plant is known. The ventilation apparatus has a cup-shaped element, which has a base and a circumferential side wall. Further, there is provided a pipe-shaped connection piece, which points towards an interior space of the rotor hub. In the known ventilation apparatus, the cup-shaped element is held by an entrance opening of the connection piece, such that the entrance opening is arranged inside the cup-shaped element. In the operation of the wind energy plant, an air flow enters into the pipe-shaped connection piece, by-passing the cup-shaped element, and by doing so it ventilates the interior space of the rotor hub. When it is raining, the position of the pipe-shaped connection piece in the cup-shaped element prevents water from reaching the interior space of the rotor hub.

However, the situation is different with a rotor hub not mounted on the wind energy plant. The rotor hub which is not mounted yet is mostly lodged on a side which is envisioned for the connection to the rotor shaft, so that the ventilation apparatus points towards the upside. It has come out that the ventilation apparatus known from DE 10 2004 058 776 B3 cannot prevent water from entering the interior space of the rotor hub in this lodging position of the rotor hub.

The present invention is based on the objective to provide an improved ventilation apparatus for the rotor hub of a wind energy plant, which makes sure that even the components situated in the interior of a rotor hub which is not mounted yet are protected against rain water.

BRIEF SUMMARY OF THE INVENTION

The apparatus for the ventilation of a rotor hub of a wind energy plant according to the present invention has a cup-shaped ventilation cap and a pipe-shaped connection piece. The cup-shaped ventilation cap has a circumferential side wall and a base portion surrounded by the side wall. The side wall is provided with at least one bore for draining water. The base portion of the ventilation cap has at least one bore for ventilation. The pipe-shaped connection piece has an air entrance opening and an air outlet opening, which runs out in an interior space of the rotor hub. The interior space of the rotor hub is connected to the surroundings via the pipe-shaped connection piece. The ventilation cap is arranged before the air entrance opening without closing the same completely. In this way, the at least one bore for ventilation in the ventilation cap is arranged outside of the air entrance opening of the pipe-shaped connection piece, so that the air entrance opening is shielded by the ventilation cap. In the ventilation apparatus of the present invention, the air entrance opening of the connection piece is protected against direct entrance of water, of rain water for instance, in that the ventilation cap covers up the air entrance opening of the connection piece and by this it closes a straight-lined connection of the surroundings with the interior space of the rotor hub. At the same time, the ventilation cap has at least one bore in its side wall, through which rain water, which has been accumulated between the connection piece and the ventilation cap, can be drained out of the ventilation apparatus again.

In a preferred embodiment, the base portion of the ventilation cap is provided in a central portion without bores, wherein the diameter of the central portion is greater than the diameter of the air entrance opening of the pipe-shaped connection piece. The central portion not provided with a bore covers up the air entrance opening.

In a preferred embodiment, the base portion consists of a central portion and a transition portion. The central portion is connected to the circumferential side wall via the transition portion. Preferably, the at least one ventilation bore of the base portion is arranged in the transition portion. Further, the central portion is depressed with respect to the side walls, and thus it is situated in a height between the upper edge and the lower edge of the side wall. By the depression, the holes in the transition portion are arranged such that there is an angle as big as possible between the normal line on the cross section area and a rain incidence direction.

In a preferred embodiment, the pipe-shaped connection piece diverges like a funnel in the region of an air entrance opening. The funnel-like divergence makes sure that no water can penetrate into the connection piece in the operation of the plant. The nacelle, and with it also the hub of the wind energy plant, are mounted on the tower in a slight inclination towards the upside. The funnel opening is broadly opened, so that the respective lower portion of the funnel wall is slightly inclined towards the downside when the hub is installed. Thus, water hitting the funnel wall flows from the funnel opening into the interior space of the ventilation apparatus, and drains towards the exterior via a bore in the side wall. When there is driving rain, the water hits the wall section of the hub, bypasses the ventilation connection piece and also drains towards the exterior via the bore in the side wall.

In a preferred embodiment, the pipe-shaped connection piece projects from a wall portion of the rotor hub on which the ventilation cap is held also. Preferably, the wall portion is constituted as a lockable door element in order to have access into the interior space of the rotor hub.

In a preferred embodiment, the wall material is made from a transparent material. On the one hand, the usage of transparent material permits light to come into the interior space of the rotor hub, and at the same time, by doing so it is possible to inspect the room under the ventilation cap.

BRIEF DESCRIPTION OF THE SEVERAL VIEWS OF THE DRAWINGS

One preferred embodiment of the ventilation apparatus of the present invention is explained in more detail by means of an example of its realisation in the following.

DETAILED DESCRIPTION OF THE INVENTION

Figure 1:
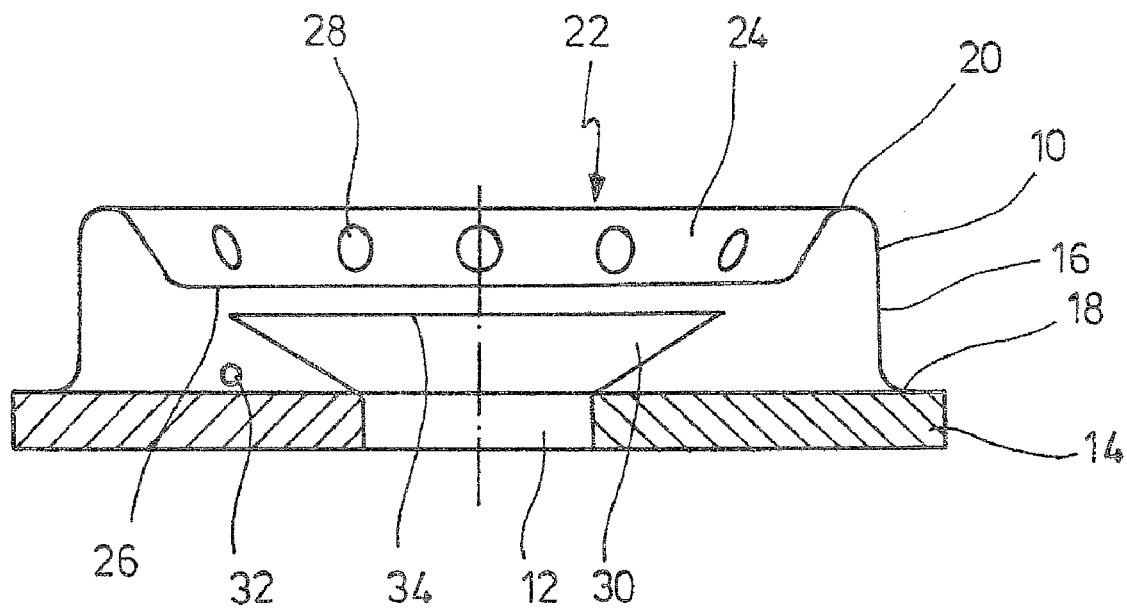
FIG. 1 shows the ventilation apparatus of the present invention in a cross section.

While this invention may be embodied in many different forms, there are described in detail herein a specific preferred embodiment of the invention. This description is an exemplification of the principles of the invention and is not intended to limit the invention to the particular embodiment illustrated FIG. 1 shows the assembly of the ventilation apparatus of the present invention in a cross section. The ventilation apparatus consists of a ventilation cap 10, which is arranged above a ventilation connection piece 12. The ventilation connection piece 12 is held in a wall portion 14 of the rotor hub. The ventilation cap 10 has a circumferential side wall 16, which is attached on the outer wall of the rotor housing with an angle offset edge portion 18

The side wall has a domed portion 20, which constitutes a circumferential ring. Inside the ring 20, there is the base portion 22 of the ventilation cap. The base portion 22 has a transition portion 24 and a horizontal portion 26. In the transition portion 24, ventilation bores 28 are provided.

The connection piece 12 arranged concentrically below the ventilation cap 10 has a portion 30 which diverges like a funnel and which constitutes the air entrance opening.

A draining bore 32 in the side wall 16 is provided below an upper edge 34 of the funnel-like diverging region.

When the rotor hub is in its usual lodging position, the ventilation apparatus occupies the position shown in FIG. 1. In this position, it is made sure that entering water cannot reach the interior space of the rotor hub. The rain water entering via the ventilation bore 28 accumulates in the room between the connection piece 12 and the ventilation cap 10. Before the water reaches a height which permits it to flow into the interior space of the rotor hub crossing above the edge 24, the water flows off via the drainage bore 32 again.

Figure 2:
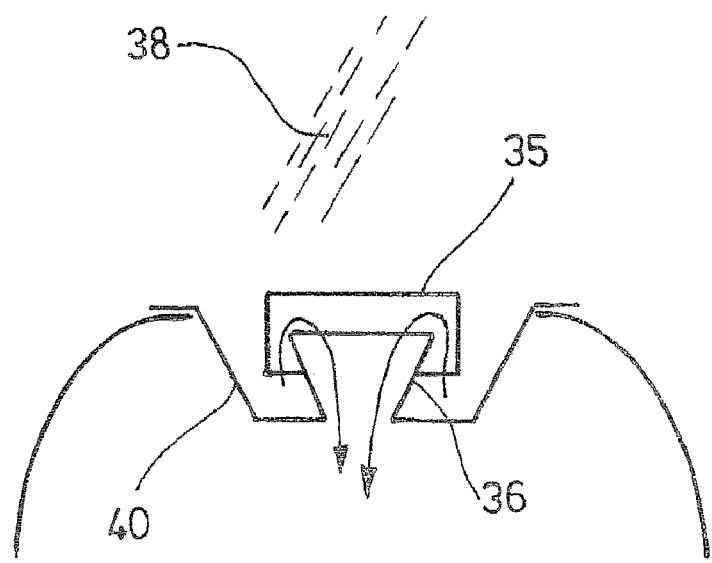
FIG. 2 shows a conventional ventilation apparatus for the rotor hub.

FIG. 2 shows a ventilation apparatus of the state of the art. In the same, there is provided a cup-shaped cover-up element 35, which is arranged via a funnel-shaped connection piece 36. Incident rain water 38 can accumulate in a holder 40 for the connection piece 36 and enter into the interior space of the rotor hub via the edge of the connection piece. Such an entrance of water may lead to the damage of already installed components in the rotor hub.

Figure 3:
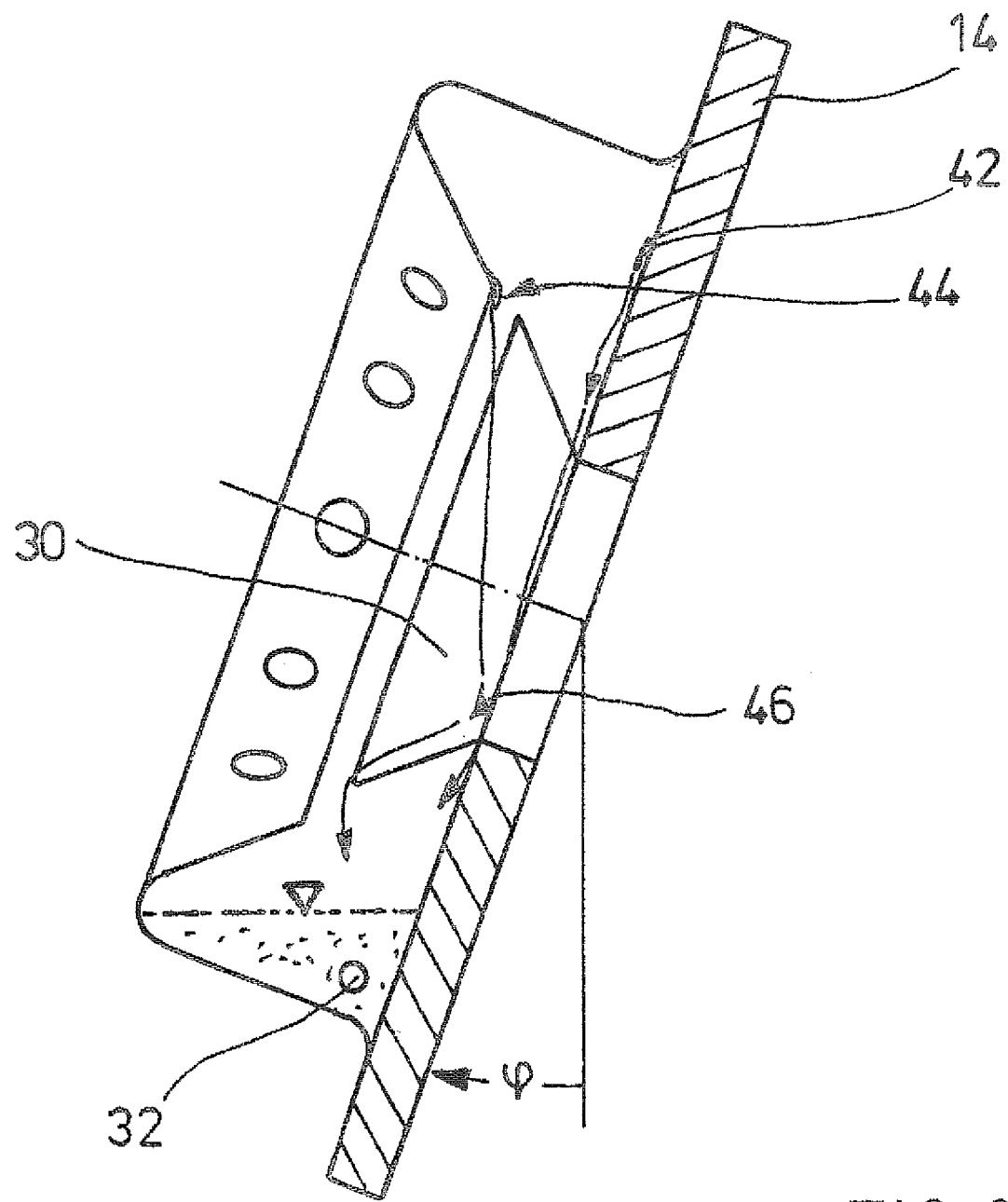
FIG. 3 shows the ventilation apparatus of the present invention in a cross section in the installed position.

The functional operation of the ventilation apparatus of the present invention in its installed position becomes clear from FIG. 3. Usually, the nacelle and with it also the hub of the wind energy plant is mounted on the tower in a slight inclination towards the upside. The inclination is indicated in FIG. 3 by the angle $\phi$ with respect to the plumbline. An entering of liquid into the ventilation apparatus can lead to an amount of liquid 42, which accumulates on the wall portion 14 of the rotor hub. The amount of liquid 42 drains towards the downside under the influence of the gravitation and it can flow out via the draining bore 32. Further, an amount of liquid 44 may also accumulate on the inner side of the ventilation cap. In the least favourable case, this amount of liquid 44 drops into the funnel-like diverging portion 30 of the connection piece 12. However, as shown in FIG. 3, the amount of liquid which had dropped down exits from the funnel again under the influence of the gravitation, and it can also exit from the ventilation apparatus via the drainage bore 32. In order to ensure the exit of the amount of liquid 46 which had dropped down, it is necessary that the opening angle of the region 30 be greater than the inclination angle $\phi$ of the rotor hub.

The air flow in the hub originates essentially by a negative pressure in the hub. Through the rotation of the rotor hub, a centrifugal force acts on the air mass which is in the rotor blade, resulting in an increase of the air pressure in the rotor blade. This increased pressure is released via a bore in the blade point, which is connected to the surroundings, and an air flow towards the outside is generated via the blades. Through this, a negative pressure is generated in the rotor hub, by which new air from the surroundings is aspirated through the ventilation apparatus. Thus, the ventilation cap can be dimensioned to be significantly smaller. The air volume contained in the rotor hub is completely exchanged about three times per hour.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims winch possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for the ventilation of a rotor hub of a wind energy plant, with a cup-shaped ventilation cap, which has a circumferential side wall (16) and a base portion (22), wherein the side wall (17) has at least one bore (32) for draining water and the base portion (22) has at least one bore (28) for ventilation, a pipe-shaped connection piece (12), which has an air entrance opening which runs out into an interior space of the rotor hub, wherein the ventilation cap is arranged before the air entrance opening and the at least one bore for ventilation (28) is arranged in the ventilation cap outside of the air entrance opening of the pipe-shaped connection piece (12) such that the air entrance opening is covered up by the ventilation cap.

2. Apparatus according to claim 1, characterised in that the base portion of the ventilation cap has a central portion without a bore, the diameter of which is greater than the diameter of the air entrance opening of the pipe-shaped connection piece.

3. Apparatus according to claim 2, characterised in that the base portion has a central portion and a transition portion, wherein the central portion is connected to the circumferential side wall via the transition portion.

4. Apparatus according to claim 3, characterised in that the at least one ventilation bore of the base portion is arranged in the transition portion.

5. Apparatus according to claim 1, characterised in that the central portion in the base portion is depressed with respect to the side walls.

6. Apparatus according to claim 1, characterised in that the pipe-shaped connection piece diverges like a funnel in the region of its air entrance opening.

7. Apparatus according to claim 6, characterised in that the opening angle of the portion diverging like a funnel is greater than or equal to an inclination angle $\phi$ of the rotor hub with respect to the horizontal line.

8. Apparatus according to claim 1, characterised in that the pipe-shaped connection piece projects from a wall portion of the rotor hub on which the ventilation cap is held.

9. Apparatus according to claim 8, characterised in that the wall portion is constituted as a lockable door element for an access into the interior of the rotor hub.

10. Apparatus according to claim 8, characterised in that the wall portion is made from a transparent material.

* * * * *